Patented Aug. 23, 1938

2,127,945

UNITED STATES PATENT OFFICE 2,127,945

DRIED EGG PRODUCT AND METHOD OF PRODUCING THE SAME

Samuel Tranin, Kansas City, Mo.

No Drawing. Application October 10, 1935,
Serial No. 44,391

5 Claims. (Cl. 99—113)

This invention relates to a dried egg product and method of producing the same.

In chemical processing and dehydration of egg whites, chemical reactions take place, due to the presence of natural organisms or to reaction of the chemical ingredients which result in putrefactive odors, discoloration and many other imperfections that are objectionable to the trade.

It is, therefore, the principal object of the present invention to provide an improved process that results in a crystal clear product entirely free from odor, which is not subject to change in its chemical characteristics with age, which does not crumble, and which readily goes into solution when used.

In accomplishing this object, I provide for removal of the undesirable components of egg whites, such as the chalaza and other portions thereof subject to decomposition. I further provide for treating the purified egg white with a preservative that does not react to impair the quality of the product.

In the present process, I provide for removal of the undesirable portions of the egg whites by treating liquid egg whites with an acidifying agent consisting of a weak edible acid solution to bring about separation of the chalaza and stringy portions of the whites and effect their removal by a skimming operation. I have found that various edible acids may be used in carrying out this step, such as tartaric, lactic, and similar acids.

I have found that a preservative which does not react to impair quality of the egg whites is glucose, preferably a dextro-glucose such as ordinary corn syrup, which may be added to the egg white in liquid form to provide an emulsion, which, when dried, results in a crystal clear product, free from odors, and which retains the natural color of the egg whites until used.

In practicing my improved process, I find it desirable to mix the glucose, for example, corn syrup, with liquid egg whites prior to the acid treatment. The proportion of glucose is not critical, however I prefer to use an amount sufficient to provide ample preservative, and to prevent any tendency for the acid to sour the egg whites during dehydration.

After adding the glucose, the mixture is warmed to about 75° F., to reduce viscosity of the syrup and assure better emulsification thereof with the liquid egg. Then about one-half of one percent of edible acid in solution is mixed with the emulsion, after which it is allowed to stand from four to thirty hours to allow the acid solution to react and effect separation of the objectionable components, namely the stringy material and chalaza which rise to the top in the form of a scum, and are skimmed off, leaving a clarified body of liquid egg free from objectionable matters.

I find that the acid not only acts to effect separation of the undesirable portions of the egg white but it goes in solution with the dextrose to give it substantially the same viscosity as the liquid egg whites, thereby providing a more uniform emulsion, in that the syrup is not so likely to separate from the desirable component of the egg white.

The dextrose, on the other hand, prevents any chemical reaction with the egg white that might tend to produce souring of putrefication that cause the undesirable odors above noted.

After removal of the scum containing undesirable portions of the egg whites, the remainder of the mixture is dehydrated. This may be effected by pouring the mixture in shallow pans and subjecting them to heat to drive off the contained moisture. When the moisture is driven off, the resulting product consists in a thin layer of crystal clear egg containing the glucose, which may then be broken into small fragments and packaged for shipment.

The treated liquid egg may also be dehydrated by spraying it in the presence of heat to provide a product that may be dispensed in powder form.

Liquid egg white prepared as above described, retains its same characteristics indefinitely, does not crumble and retains its clear light amber color until used. Since the glucose is readily soluble in water, the dehydrated egg product almost immediately goes into solution to give the same effects as liquid egg before dehydration. A solution prepared from the dried product therefore has the same beating up qualities as original egg whites, and gives the same natural result in the various bakery or other products in which it is used.

What I claim and desire to secure by Letters Patent is:

1. A method of processing egg whites consisting of mixing liquid egg white with glucose to form an emulsion and prevent souring of the egg white when treated with an acidifying agent, acidifying the emulsion to effect separation of a scum containing chalaza and stringy portions of the egg white, removing the scum, and dehydrating the remaining portion of the emulsion to form a brittle, transparent and crystalline product.

2. A method of processing egg whites including mixing liquid egg white with glucose to form an emulsion and to prevent souring of the egg white in the presence of acid, treating the emulsion with an edible acidifying agent of the type consisting of lactic and tartaric acids for a period of time sufficient to effect separation of the chalaza and stringy portions of the egg white, removing the chalaza and stringy portions from the emulsion, and dehydrating the remaining portions of the emulsion to form a clear, brittle and crystalline product.

3. A method of processing egg whites including mixing liquid egg white with glucose to prevent souring of the egg white when treated with an edible acid, heating the mixture to about 75° F. to reduce the viscosity of the mixture and promote emulsification of the glucose with the egg white, treating the emulsion with an edible acidifying agent of the type consisting of lactic and tartaric acids for a period of time sufficient to effect separation of the chalaza and stringy portions of the egg white, removing the chalaza and stringy portions, and dehydrating the remaining portions of the emulsion to form a brittle, transparent and crystalline product.

4. A method of processing egg whites including mixing liquid egg white with glucose to prevent souring of the egg white when treated with an edible acid, heating the mixture to about 75° F. to reduce the viscosity of the mixture and promote emulsification of the glucose with the egg white, treating the emulsion with an edible acidifying agent of the type consisting of lactic and tartaric acids for a period of time sufficient to effect separation of the chalaza and stringy portions of the egg white and to bring the viscosity of the glucose to substantially that of the egg whites, removing the chalaza and stringy portions, and dehydrating the remaining portions of the emulsion to form a brittle, transparent and crystalline product.

5. An egg white product comprising a dehydrated mixture of egg white, an edible acid of the type consisting of lactic and tartaric acids in the proportion of approximately one-half of one per cent acid prior to dehydration, and glucose in sufficient quantity to prevent the acid from souring the egg white.

SAMUEL TRANIN.